H. J. FRIES.
DOUBLE EXPOSURE AND BLANK FILM PREVENTING DEVICE FOR CAMERAS.
APPLICATION FILED JAN. 13, 1920.
1,400,872. Patented Dec. 20, 1921.
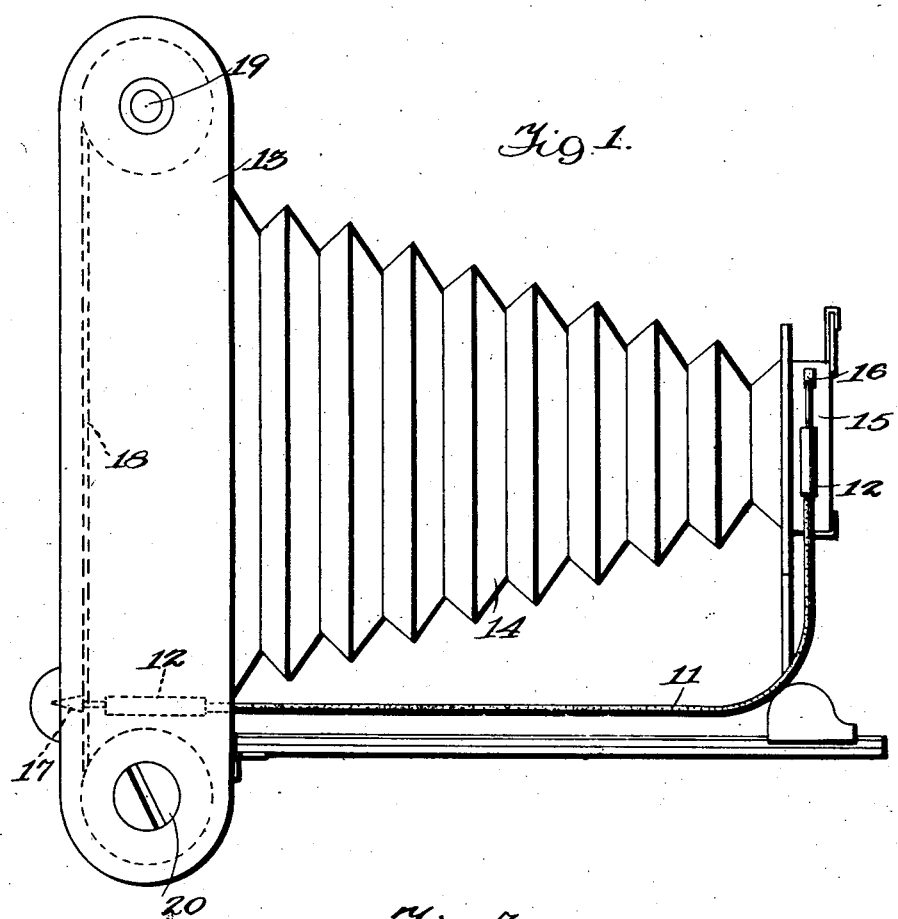
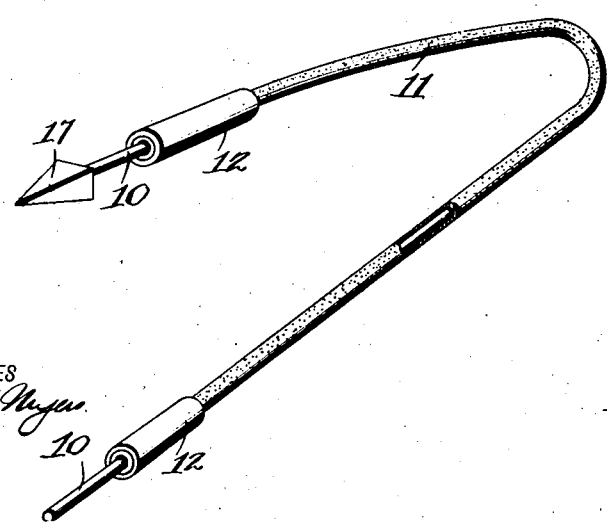

H. J. FRIES.
DOUBLE EXPOSURE AND BLANK FILM PREVENTING DEVICE FOR CAMERAS.
APPLICATION FILED JAN. 13, 1920.

1,400,872.

Patented Dec. 20, 1921.

WITNESSES

INVENTOR
H. J. FRIES,
BY
ATTORNEYS

UNITED STATES PATENT OFFICE.

HOWARD JOHNSON FRIES, OF TACOMA, WASHINGTON.

DOUBLE-EXPOSURE AND BLANK-FILM PREVENTING DEVICE FOR CAMERAS.

1,400,872.  Specification of Letters Patent.  Patented Dec. 20, 1921.

Application filed January 13, 1920. Serial No. 351,141.

*To all whom it may concern:*

Be it known that I, HOWARD J. FRIES, a citizen of the United States, and a resident of Tacoma, in the county of Pierce and State of Washington, have invented certain new and useful Improvements in Double-Exposure and Blank-Film Preventing Devices for Cameras, of which the following is a specification.

My present invention relates generally to cameras and more particularly to a double exposure and blank film preventing device, my object being the provision of a simple, positive device of this nature which may be readily applied to cameras now in use as well as to those at the time of manufacture.

A further object is the provision of an inexpensive device of this nature which will be lasting and durable in use.

In the accompanying drawings illustrating my present invention,

Figure 1 is a side view of a camera provided with my improvements.

Fig. 3 is a detail perspective view of the invention removed from the camera.

Referring now to these figures and particularly to Fig. 3 my invention proposes an attachment for cameras including a flexible shaft 10, which passes through a suitable flexible sheath 11, the latter of which has metal tubes 12 at its opposite ends to facilitate its attachment to a camera.

Figure 2:
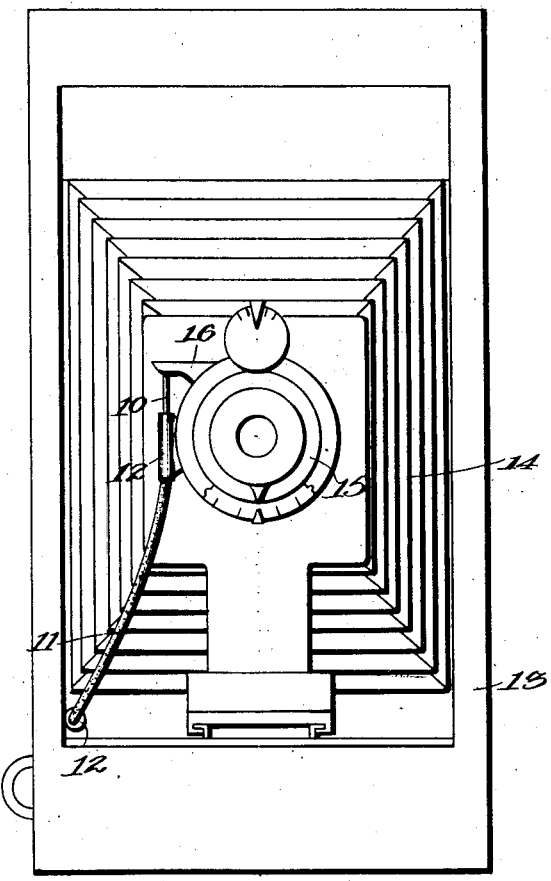
Fig. 2 is a front elevation.

In Figs. 1 and 2 I have shown a camera of the folding roll film type simply because of frequency of this type in use as compared to other types, the camera casing being indicated at 13, the bellows at 14 and the lens holder at 15, which latter as usual, includes the shutter mechanism of which the click lever 16 is a part.

The metal tube 12 at one end of the sheath 11 is secured in upright position upon one side of the lens holder 15 by any suitable means as for instance by soldering the same in place, and the respective projecting end of the flexible shaft 10 is suitably secured, as by similar means, to the lower surface of the click lever 16 or other convenient point.

The other metal tube 12 is secured to the inner surface of one side wall of the camera casing 13 or other convenient point as clearly seen in Fig. 1, and the respective end of shaft 10 has a pyramidal shaped head 17, the axis of which is disposed in alinement with one side edge of the roll film 18 passing from the feed roll 19 to the take-up roll 20.

Figure 4:
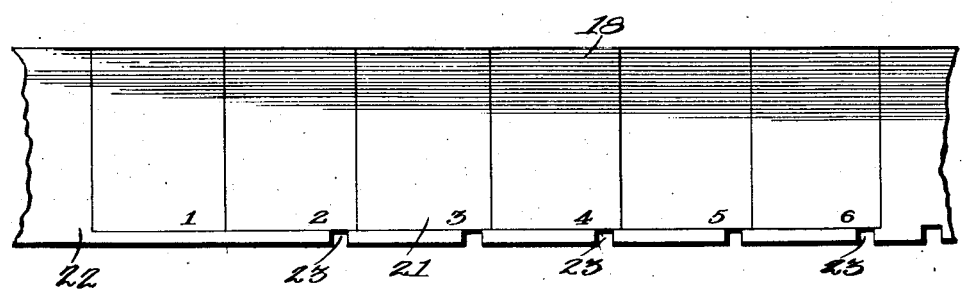
Fig. 4 is a plan view of a film constructed in accordance with my invention as presently described.

As seen in Fig. 4 the roll film 18 includes the usual sensitized surface 21 and a backing 22, one side edge of the latter of which extends beyond the respective edge of the sensitized surface and is provided with notches 23 at spaced points therealong, sufficient in size to permit the pyramidal shaped head 17 to pass freely through the same. These notches 23 are preferably so spaced that they come into alinement with the head 17 before their respective film spaces come into operative position with respect to the lens carried by the holder 15.

As before stated the head 17 is disposed with its axis in the vertical plane of the notched side edge of the roll film or more particularly the backing sheet 22 of the film, and thus when the click lever 16 is pressed downwardly to complete an exposure, the head 17 is forced rearwardly past the edge of the roll film, the backing sheet 22 of the latter of which flexes for this purpose, and engages the inner shoulder of the head so as to prevent its forward movement. In this way the click lever 16 is locked in downward position after each exposure and until the film is turned to place a fresh exposure space in effective position opposite the lens, it is obvious a second exposure cannot be made. During the advancing movement of the film, after exposure, one of its side notches 23 will be shifted into registry with the head 17 just before a fresh exposure space of the film reaches proper position for exposure, and when one of the notches reaches the head 17 in this way, it is obvious the head 17 will shift forwardly through the notch and the click lever 16 will return to its upper normal position.

It will be appreciated that the effect of the engagement of the head 17 by the edge of the roll film after each exposure is positive and ample to prevent the return of the click lever under its normal spring action for its full return stroke so as to thus serve in itself as a reminder to the user that the film should be turned. At the same time however a partial return stroke is permitted so that the invention does not defeat the taking of either what are known as "bulb" pictures or the completion of time exposures.

It is obvious that the invention may be adapted to various shutter actuating devices, for instance either bulb actuating means or what are known as wire releases, the important consideration in any of these devices being the connection of one end of the shutter controlling wire 10 so that the wire is moved when the shutter mechanism is actuated.

I claim:

1. In a film camera adapted to use a film having a notched edge and having a shutter mechanism and an actuating means therefor, a film engaging member connected to and movable by the shutter actuating means for engagement with the edge of a film and releasable through the notches of the film edge.

2. In a film camera adapted to use a film having a notched edge and having a shutter mechanism and an actuating means therefor, a film having a film engaging member connected to and movable by the shutter actuating means for engagement with the edge of a film and releasable through the notches of the film edge, said engaging member being in the form of a flexible wire connected at one end to the film actuating means and having a shouldered film engaging head at its opposite end.

3. In a film camera adapted to use a film having a notched edge and having a shutter mechanism and actuating means therefor, a film engaging member of flexible form connected at one end to the shutter actuating means and having a shouldered head at its opposite end engageable with one edge of a film and movable through the notches thereof, and a flexible sheath through which the said member extends, the ends of which sheath are respectively connected to portions of the camera adjacent to the film and to the shutter mechanism.

HOWARD JOHNSON FRIES.